United States Patent
Mueggenburg

(10) Patent No.: US 6,206,684 B1
(45) Date of Patent: Mar. 27, 2001

(54) STEAM GENERATOR INJECTOR

(75) Inventor: H. Harry Mueggenburg, Carmichael, CA (US)

(73) Assignee: Clean Energy Systems, Inc., Sacramento, CA (US)

( * ) Notice: Subject to any disclaimer, the term of this patent is extended or adjusted under 35 U.S.C. 154(b) by 0 days.

(21) Appl. No.: 09/235,563

(22) Filed: Jan. 22, 1999

(51) Int. Cl.[7] .................................................. F23J 7/00
(52) U.S. Cl. ............................ 431/4; 431/2; 431/350; 239/8; 239/419.3; 239/559; 239/416.1
(58) Field of Search ........................ 431/350, 4, 48, 431/354, 2; 60/39.55, 39.53, 740; 239/419.3, 559, 555, 8, 416.1, 405, 487, 399

(56) References Cited

U.S. PATENT DOCUMENTS

| | | | |
|---|---|---|---|
| 1,820,755 | * | 8/1931 | McMullen ............................. 431/4 |
| 2,004,317 | * | 6/1935 | Forster .............................. 239/416.1 |
| 2,033,010 | * | 3/1936 | Russell ................................ 431/4 |
| 2,368,827 | * | 2/1945 | Hanson et al. ......................... 431/9 |
| 2,662,373 | * | 12/1953 | Sherry et al. ..................... 60/39.55 |
| 2,763,987 | * | 9/1956 | Kretschmer ....................... 60/39.55 |
| 3,134,228 | | 5/1964 | Wolansky . |
| 3,183,864 | * | 5/1965 | Stengel ................................ 431/4 |
| 3,423,028 | * | 1/1969 | Stupakis ........................ 239/419.3 |
| 3,862,819 | * | 1/1975 | Wentworth, Jr. ..................... 431/4 |
| 4,224,991 | | 9/1980 | Sowa . |
| 4,327,547 | * | 5/1982 | Hughes et al. .................... 60/39.55 |
| 4,337,618 | * | 7/1982 | Hughes et al. .................... 60/39.55 |
| 4,425,755 | * | 1/1984 | Hughes et al. .................... 60/39.55 |
| 4,622,007 | * | 11/1986 | Gitman .............................. 431/351 |
| 4,910,008 | * | 3/1990 | Prudhon .............................. 431/2 |
| 5,175,995 | | 1/1993 | Pak . |
| 5,479,781 | * | 1/1996 | Fric et al. ............................ 60/740 |
| 5,628,184 | * | 5/1997 | Santos ................................. 60/737 |
| 5,636,980 | * | 6/1997 | Young et al. ...................... 431/350 |
| 5,997,595 | * | 12/1999 | Yokohama et al. ................. 431/354 |

FOREIGN PATENT DOCUMENTS

| | | |
|---|---|---|
| 140516 | 3/1920 | (GB) . |
| WO91 02886 | 3/1991 | (WO) . |

* cited by examiner

Primary Examiner—Ira S. Lazarus
Assistant Examiner—David Lee
(74) Attorney, Agent, or Firm—Heisler & Associates

(57) ABSTRACT

A system and method is provided in the form of an injector assembly 10 for thoroughly premixing fuel and oxidizer reactants and water upstream of a combustion chamber 12. The assembly includes a housing 20 that has a first stack 30 for thoroughly mixing reactants from an oxidizer source 40 and a fuel source 50. It also includes a second stack 80 for mixing and blending the prior mixed reactants with coolant water, before ignition within a combustion chamber 12. The mixing and blending is accomplished in mixing cups 100 where the water and reactant mixture are joined in perpendicular flow streams. Some water is also introduced tangentially in the mixing cups to promote vortical flow and further enhance the mixing process. An alternative injector assembly 210 is also provided that mixes the reactants in a swirl cup 260 and enhances mixture ratio uniformity by means of a diffusion plate insert 270.

15 Claims, 14 Drawing Sheets

STEAM GENERATOR INJECTOR

FIELD OF THE INVENTION

The following invention relates to a system for injecting combustible mixtures into a combustion chamber. More specifically, this invention relates to a steam generator injector designed to inject a thoroughly premixed combination of oxidizer, fuel, and coolant water into a combustion chamber which has steam and carbon dioxide as its primary combustion species.

BACKGROUND OF THE INVENTION

Injecting combustible fluids and coolants into combustion chambers has long been a common practice in the prior art. Typically, fuel and oxidizer reactants are brought to an injector face by separate flow paths. The reactant flow paths are designed to control and meter the fluids prior to their exit from orifices in the injector face. Internal geometry, spacing, and number of the orifices are configured to promote efficient mixing as the combustible fluids flow into a combustion chamber and travel away from the injector face. An ignition source then ignites the combustible mixture of reactants and large quantities of heat are released.

The large heat release in the combustion chamber usually makes it necessary to actively cool its walls to prevent combustion chamber damage. This is typically accomplished by enveloping the parts of the chamber to be cooled with a coolant, generally a fuel or water. Often more cooling capacity is necessary, as when stoichiometric mixture ratios cause extremely high combustion temperatures. In this case, coolant is injected directly into the combustion chamber and mixes with the combustion fluids. Cooling systems such as that disclosed by Walker (U.S. Pat. No. 2,770,097 are of this type. are of this type.

There are several drawbacks to the prior art approach. First, stoichiometric mixture ratios are generally not used because of the excessive heat generated (as well as pollutant generation problems), thereby limiting the heat release of the reactants below their full potential. An important reason reactants are not combusted at stoichiometric mixture ratios is that high levels of cooling are required to prevent damage to the combustion chamber and injector face. Another important reason is that a catastrophic explosion could result if the combustion flame propagated back into the injector body.

The second drawback to the prior art approach is that the mixture ratio distribution within the chamber is often not uniform. The non-uniformity occurs because machining tolerances permit variations in the orifice geometry and spacing and because manifold velocities are often not uniform. This leads to streaking of the combustion walls and necessitates the use of a chamber wall film coolant. The coolant, generally fuel, reduces the overall combustion efficiency of the process and results in using more fuel than otherwise would be necessary.

Beichel (U.S. Pat. No. 5,709,077) teaches a prior art system which disclose combusting hydrocarbon fuel with oxygen at a stoichiometric ratio to produce a high temperature water and carbon dioxide working fluid without any pollutants. This system teaches water delivery to cool the combustion reaction somewhat. However, no system for injecting the reactants and water into the combustion chamber is shown other than direct entry into the combustion chamber as disclosed in the prior art.

Accordingly, a need exists for an apparatus and system that thoroughly mixes the combustible fluids and allows combustion of fuels at stoichiometric mixture ratios without damaging the combustion chamber or incurring undesirable combustion inefficiencies.

SUMMARY OF THE INVENTION

The steam generator injector apparatus and system of this invention solves the problems associated with extremely high combustion temperatures, upstream flame propagation, and non-uniform mixture ratio distribution. It does so by reducing combustion temperatures of reactants having stoichiometric mixture ratios and by eliminating non-uniform mixture ratio distribution. Specifically, the injector system has two primary design features that provide these benefits. The first design feature is that the injector system thoroughly premixes the combustion reactants before they enter the injector manifold and orifices. This essentially eliminates non uniform mixture ratio distribution. Machining errors, non-uniform manifold velocities, and orifice distribution and geometries on the injector face have minimal negative impact because the present invention does not rely on these features to promote mixing.

The other distinguishing design feature of the present invention is that coolant is mixed with the reactants prior to injection into the combustion chamber. Coolant streams are injected perpendicular to streams of premixed reactants and in a manner that induces flow to ensure thorough mixing. The combination of reactants and coolants are injected into the combustion chamber where the combination is ignited. The coolant reduces what would otherwise be extremely high combustion temperatures throughout the combustion zone by absorbing a portion of the released heat. By contrast, prior art does not control the heat release of the combusting reactants. Instead, the walls of the combustion chamber are protected from the high temperature by regenerative cooling, film cooling along the interior combustion chamber walls, or both. The latter result in combustion inefficiencies not found in the present invention.

A typical operation of the system is as follows. Continuous sources of fuel, oxidizer, and coolant flow are made available for use in the injector. Typical examples are methane, oxygen, and water as the fuel, oxidizer, and coolant, respectively. Fuel and oxidizer are drawn from separate sources through individual feed lines. They are then brought together inside the injector assembly to a first mixing region at desired proportions ranging from fuel rich to oxidizer rich. In the preferred embodiment of this invention, the mixing area consists of a stack of platelets that bring the reactants together in an inner chamber in such a manner as to induce substantially complete mixing of the reactants. The substantially mixed reactants are then channeled to a second mixing region.

Concurrently, coolant is drawn from its source through a feed line into and along an injector face. The coolant reduces the temperature of the face during combustion to acceptable levels for the particular injector face material used. The coolant passes from the injector face into the second mixing region. In this region the coolant is atomized and brought together with the substantially mixed reactants and the fluids are blended into a single mixture. The velocity of the substantially mixed reactants causes the water droplets formed by the self impinging water streams to shear and further promote atomization of the coolant immediately prior to injecting into the combustion chamber. This combined mixture is channeled through holes in the injector face that open into the combustion chamber. The combined mixture goes into the combustion chamber where combustion is initiated by an igniter.

OBJECTS OF THE INVENTION

Accordingly, a primary object of the present invention is to provide an injector assembly that premixes reactants from the injector upstream of the injector face.

Another object of the present invention is to blend coolant and reactants before injection into a combustion chamber.

Another object of the present invention is to reduce combustion temperatures of reactants being combusted in stoichiometric proportions.

Another object of the present invention is to promote safe combustion of reactants at stoichiometric mixture ratios.

Another object of the present invention is to prevent uneven mixture ratio combustion that results in local hot zones along the combustion chamber walls.

Another object of the present invention is to prevent damage to combustion chambers.

Another object of the present invention is to reduce combustion temperatures of reactants.

Another object of the present invention is to prevent adverse effects on combustion chambers due to geometric variations in injector orifice geometry and spacing.

Another object of the present invention is to reduce or eliminate wall film cooling requirements for combustion chambers.

Another object of the present invention is to improve the combustion efficiency of reactants.

Another object of the present invention is to reduce the axial length to achieve complete combustion within the combustion chamber.

Another object of the present invention is to reduce the time to achieve complete combustion within the combustion chamber.

Other further objects of the present invention will become apparent from a careful reading of the included drawing figures, the claims and detailed description of the invention.

BRIEF DESCRIPTION OF THE DRAWINGS

FIG. 1 is a flow diagram of the overall system. It shows the primary features of the present invention as fluids flow from fuel and oxidizer supply sources, through first and second mixers, out an injector face, and through a combustion chamber.

FIG. 2 is a sectional view depicting all the major components of the 10 MW injector and its integration with both fluid sources and the combustion chamber. The location of a first stack of platelets for mixing oxidizer and fuel is shown. Internal flow details are not. Also shown is the location and some internal details of a second stack that functions to cool the injector face and uniformly mix the reactants with water coolant.

FIGS. 3 and 4 are top view drawings depicting structural details of individual fuel and oxidizer platelets respectively. Also shown are flow directions of the fuel and oxidizer through their respective outlets and outputs.

FIG. 5 is a perspective side view of the first stack of alternating fuel and oxidizer platelets. The figure also shows the flow direction of fuel and oxidizer flow through their respective outlets and outputs.

FIG. 6 is a sectional view of the second stack. This figure shows the internal arrangement of platelets configured to allow water to flow along the injector face and into a mixing cup. The figure also shows the internal arrangement that allows the reactant mixture to combine with the water coolant and then pass to a combustion chamber.

FIG. 7 is a side plan view of a mixing cup shown in section in which the reactants and water are combined.

FIGS. 8 and 9 present top plan view details of an individual specific platelet in which the reactants are mixed with water.

FIG. 10 is a bottom plan view of a face plate which forms a last platelet in a series of platelets which together form the second stack.

FIG. 11 is a top plan view of a first platelet opposite the face plate of the second stack.

FIG. 12 is a detail of a portion of that which is shown in FIG. 11.

FIG. 13 is a detail of a next platelet or platelets adjacent the first platelet of FIGS. 11 and 12.

FIG. 14 is a plan view of a platelet or platelets adjacent to the platelets of FIG. 13.

FIG. 15 is a detail of a portion of that which is shown in FIG. 14.

FIG. 16 is a detail of a next platelet adjacent the platelet or platelets of FIGS. 14 and 15.

FIG. 17 is a detail of a portion of a mixing platelet oriented as a next platelet adjacent the platelet of FIG. 16.

FIG. 18 is a detail of a portion of a next platelet adjacent the platelet of FIG. 17.

FIG. 19 is a detail of a portion of a platelet adjacent the platelet of FIG. 18.

FIG. 20 is a detail of a portion of a platelet adjacent the platelet of FIG. 19.

FIG. 21 is a detail of a portion of a platelet adjacent the platelet of FIG. 20.

FIG. 22 is a detail of a portion of a platelet adjacent the platelet of FIG. 21.

FIG. 23 is a detail of a portion of a platelet adjacent the platelet of FIG. 22.

FIG. 24 is a detail of a portion of the face plate of FIG. 10, the face plate located adjacent the platelet of FIG. 23.

Figure 25:
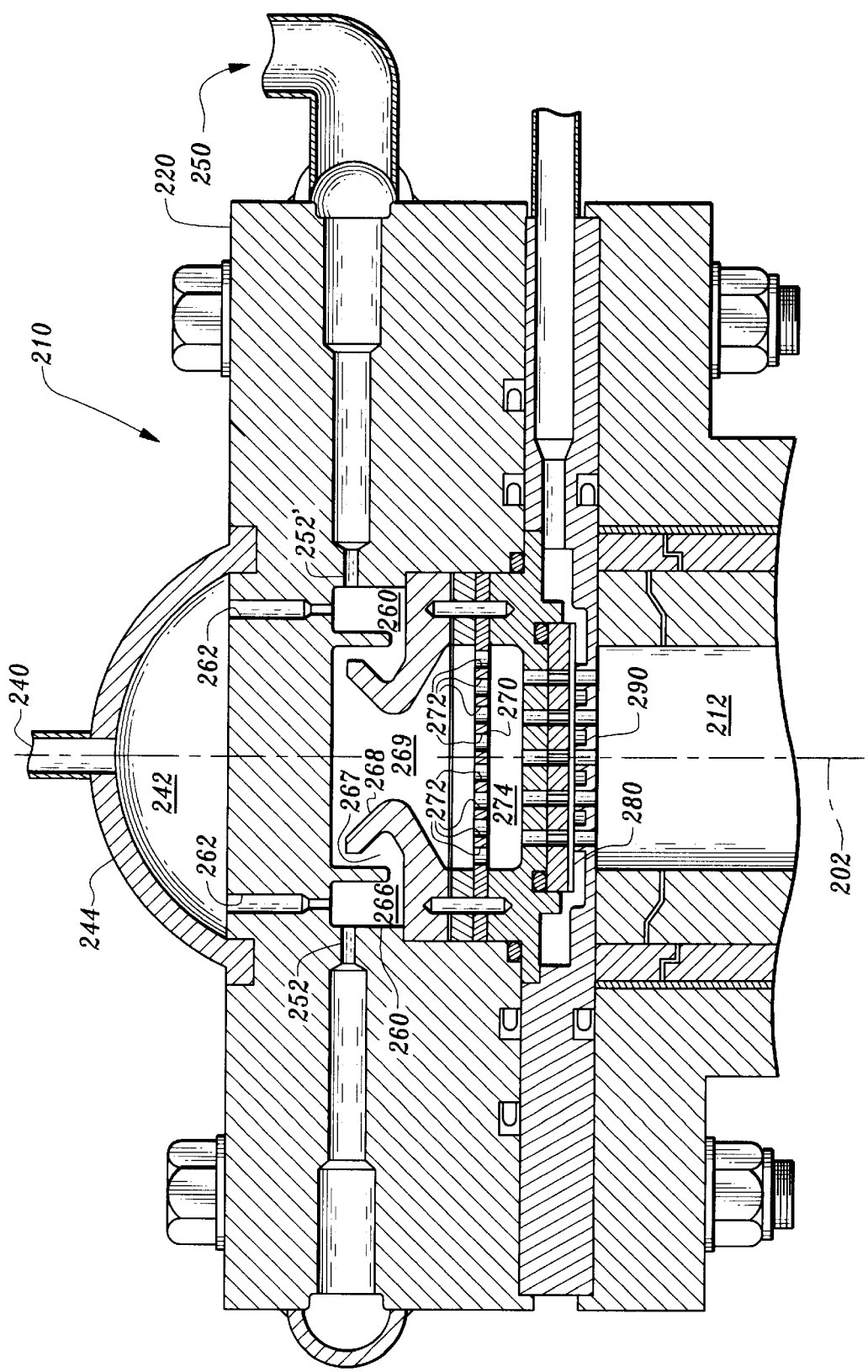
FIG. 25 is associated with an alternate embodiment of this invention for generating on the order of 1 MW of power.

An alternate embodiment of this invention is shown in FIG. 25. This figure depicts a sectional view of the major components of an alternate injector assembly for a facility capable of generating on the order of 1 MW of electricity.

DESCRIPTION OF THE PREFERRED EMBODIMENT

Referring to the drawings, wherein like reference numerals represent like parts throughout the various drawing figures, reference numeral 10 (FIGS. 1 and 2) is directed to an injector assembly for injecting substantially premixed fuel, oxidizer and coolant into a combustion chamber 12. This method of injection promotes safe combustion of reactants at mixture ratios near stoichiometric proportions (or reactants with inherently high combustion temperatures generally) while preventing damage to the injector 10 and the combustion chamber 12.

Figure 1:
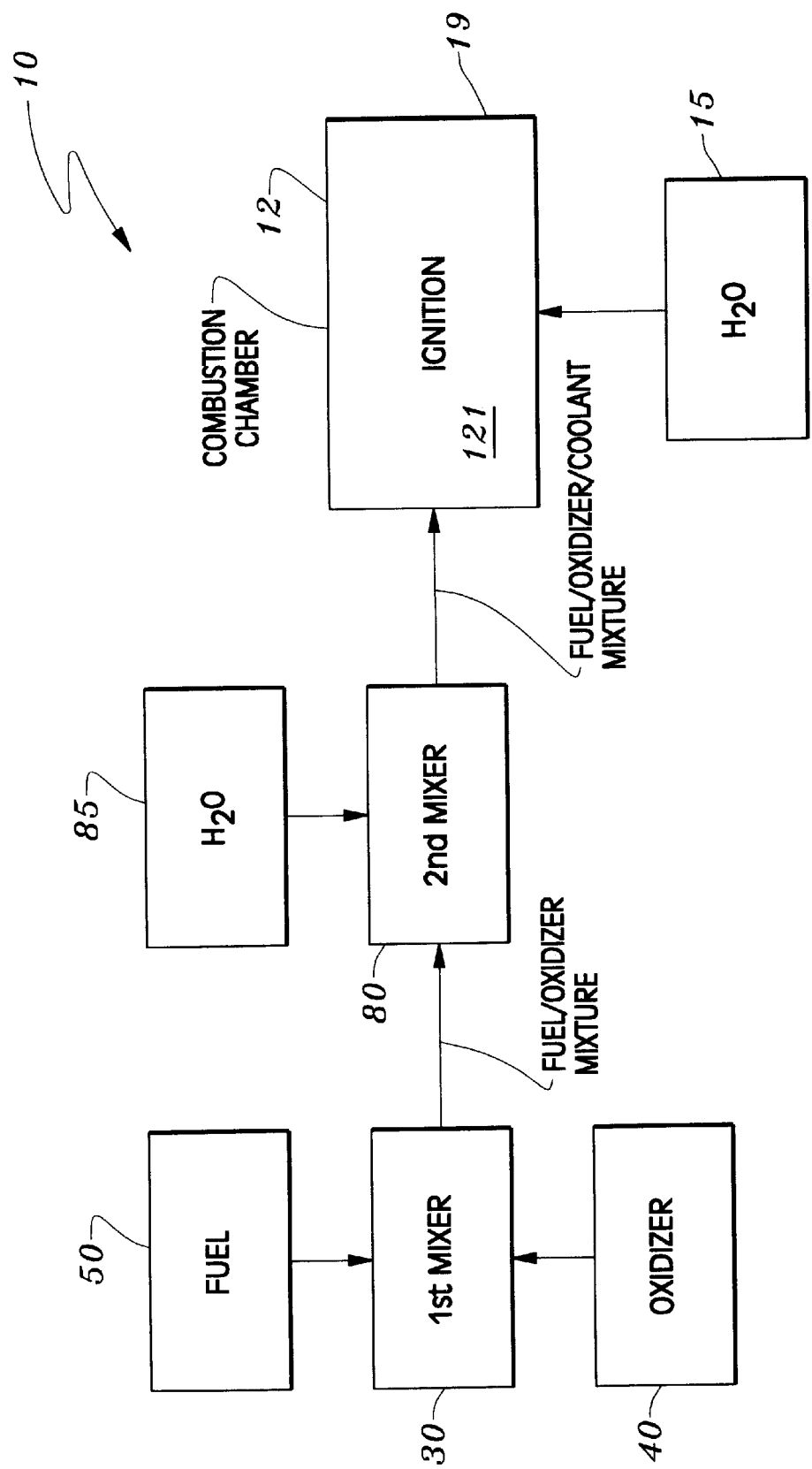
FIGS. 1–24 are associated with the preferred embodiment of this invention. The preferred embodiment is an injector apparatus and system for generating on the order of 10 megawatts (MW) of power.

In essence, and with particular reference to FIG. 1, the injector assembly 10 includes a first mixer 30, a second mixer 80, a face 121, and a combustion chamber 12. The assembly also includes an oxidizer source 40, a fuel source 50, a primary coolant source 85, and a secondary coolant source 15. The combustion chamber 12 includes an exhaust end 19 through which the combustion species flow to an energy extraction device such as a gas or steam turbine.

Oxidizer and fuel reactants are channeled into the first mixer 30 through the oxidizer source 40 and fuel source 50 respectively. There they are combined and thoroughly mixed. The fuel/oxidizer mixture is then channeled into a second mixer 80 where the mixture is thoroughly mixed and blended with coolant, such as water, from a primary coolant source 85.

This fluid combination is then channeled through a face 121 that opens into the combustion chamber 12 toward an exhaust end 19. The fluid combination is ignited while in the combustion chamber 12 and the combustion species, which are composed primarily of steam and carbon dioxide, flow toward and through the exhaust end 19. A secondary coolant may be brought into the combustion chamber 12 from a secondary coolant source 15 if desired. However, the pre-mixing of the reactants with coolant prior to combustion generally decreases the importance of introduction of secondary coolant into the combustion chamber 12.

More specifically, and with particular reference to FIGS. 2–10, details of the injector assembly 10 are provided. The injector assembly 10 (FIG. 2) has a housing 20 that bolts to a flange 16 formed circumferentially around a combustion chamber 12. A mixing platelet 110 is "sandwiched" in between the housing 20 and the flange 16. The combustion chamber 12, the housing 20, and the mixing platelet 110 are generally symmetric about their respective longitudinal axes. Their longitudinal axes are adjacent and substantially co-linear from end to end, thereby forming a single centerline 2 of the components specifically and the injector assembly 10 as a whole. Reactants flow generally from left to right along the centerline 2. For purposes of this disclosure, flow from left to right is hereinafter designated flow from upstream to downstream.

The housing 20 (FIG. 2) has an outer surface 21 with numerous discontinuities in the surface 21. These discontinuities lead to cavities in the housing 20 that accommodate various components. One discontinuity in an upstream perpendicular portion of the outer surface 21 is an opening for a circular central bore 22 about the centerline 2. The central bore 22 extends downstream and opens into the combustion chamber 12. The bore 22 has a relatively large diameter over approximately one-fourth of its length. Then the bore 22 nearly instantaneously narrows to a substantially smaller diameter and maintains that diameter over approximately two-thirds of its length. Over the remainder of its length, the bore 22 conically narrows and then maintains a constant diameter until it opens into the combustion chamber 12. The particular shape of the central bore is just one of many acceptable shapes. For example, another appropriate shape combination is cone/cylinder/cone/cylinder. The bore 22 can be fitted with an ignition spark plug or other means to initiate combustion within the chamber 12. Alternatively, the bore 22 can be used for placement of sensors into the combustion chamber 12 or portions of the injector 10.

Two other discontinuities in the upstream portion of the outer surface are openings for a thermocouple 38 and a fuel source 50. The thermocouple 38 penetrates the upstream, perpendicular portion of the outer surface 21 below and at an acute angle with the centerline 2. The thermocouple 38 conformably nests within the housing 20. It extends from the outer surface 21, through the housing 20 and into an inner chamber 32 encapsulated by the housing 20. The inner chamber 32 is a cavity within the chamber 32. The inner chamber 32 has a somewhat toroidal shape and a central axis preferably coincident with the centerline 2. The inner chamber 32 extends from the thermocouple 38 penetration point to a downstream, perpendicular portion of the outer surface 21.

Figure 2:
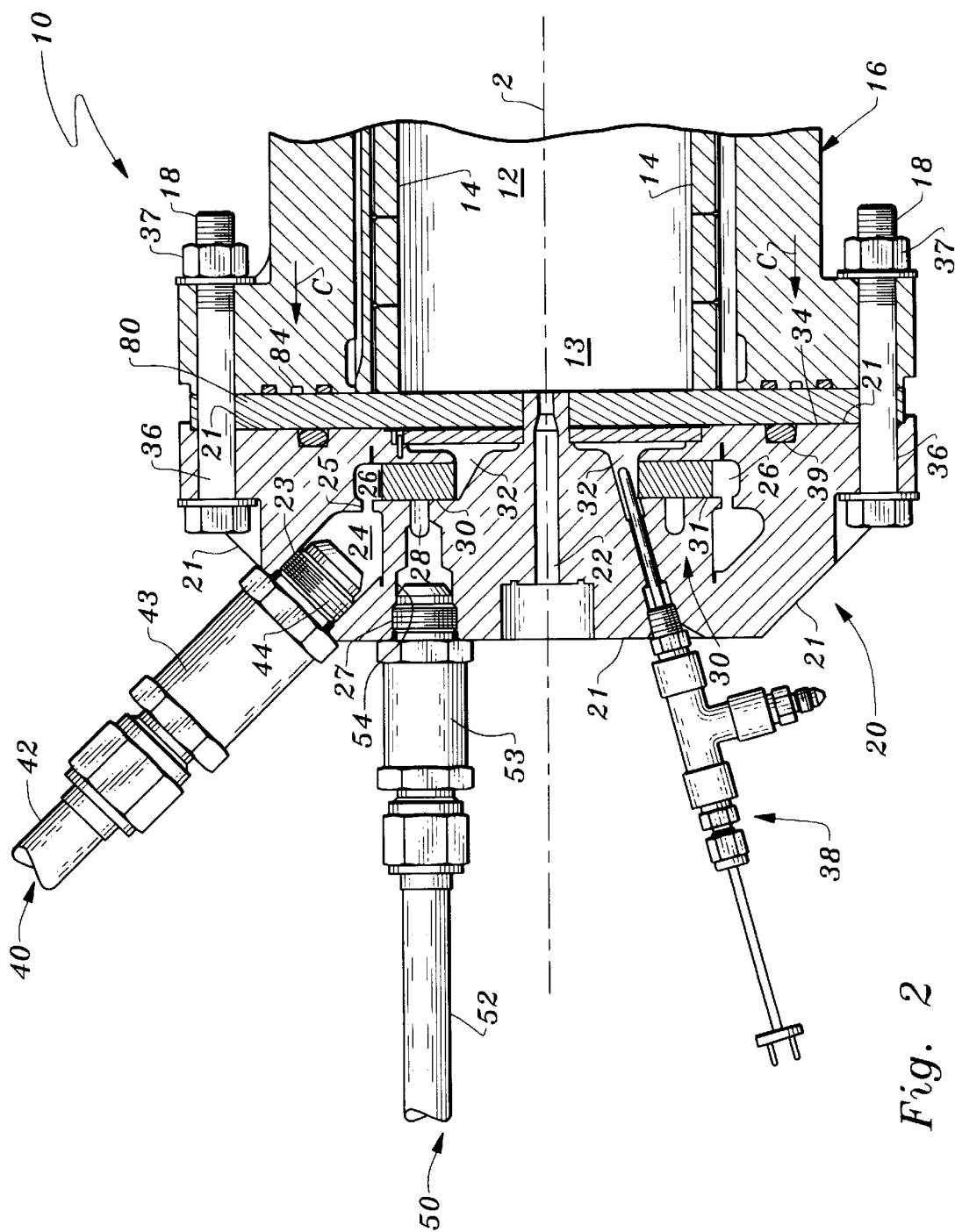

The fuel source 50 penetrates the upstream, perpendicular portion of the outer surface 21 above and parallel to the centerline 2. The fuel source 50 preferably has three feed lines 52 (only one of which is shown in FIG. 2) external to the housing 20. The feed lines 52 each include a check valve 53 which prevents flow back up to the fuel source 50. The feed lines 52 are connected to fuel tips 54 that nest within fuel ports 27 within the housing 20. Each fuel tip 54 is integrally connected to a common pre-chamber 28. The pre-chamber 28 is entirely encapsulated within the housing 20 with its central axis preferably coincident with the centerline 2. However, the diameter relationships between the pre-chamber 28 and the inner chamber 32 are such that the entirety of the inner chamber 32 is inboard of the pre-chamber 28. The fuel tip 54 preferably includes a high pressure fitting which allows the fuel tip 54 to mate with the fuel port 27 in a high pressure sealed manner.

Another discontinuity in the outer surface 21 provides an entry into the housing 20 for the oxidizer source 40. The oxidizer source 40 preferably has six feed lines 42 (only one of which is shown in FIG. 2) external to the housing 20. The feed lines 42 each include a check valve 43 which prevents flow back up to the oxidizer source 40. The feed lines 42 are each connected to an oxidizer tip 44. The oxidizer source 40 penetrates a portion of the outer surface 21 above the centerline 2 and the fuel source 50. This portion of the outer surface 21 extends from the top of the upstream, perpendicular portion of the outer surface in a direction generally radially outward and downstream. The oxidizer tip 44 nests in a high pressure sealing manner within an oxidizer port 23 in the housing 20 and is integrally connected to a fore-chamber 24. The fore-chamber 24 is connected to a peripheral chamber 26 by a neck 25 in such a manner as to permit oxidizer fluid to freely pass from the oxidizer tip 44, through the neck 25, and into the peripheral chamber 26. The fore-chamber 24, the neck 25, and the peripheral chamber 26 each have a generally toroidal shape with their longitudinal axes preferably coincident with the centerline 2. The fore-chamber 24 is connected to and opens into the neck 25. The neck 25 is connected to and opens into the peripheral chamber 26, thereby establishing a continuous flow path between the components.

The outer surface 21 also has a series of discontinuities on the outer periphery that provide openings for a series of bolt holes 35 for joining to the second stack 80 and the flange 16 (which encapsulates the combustion chamber 12), using a series of bolts 18 and nuts 37.

Figure 4:
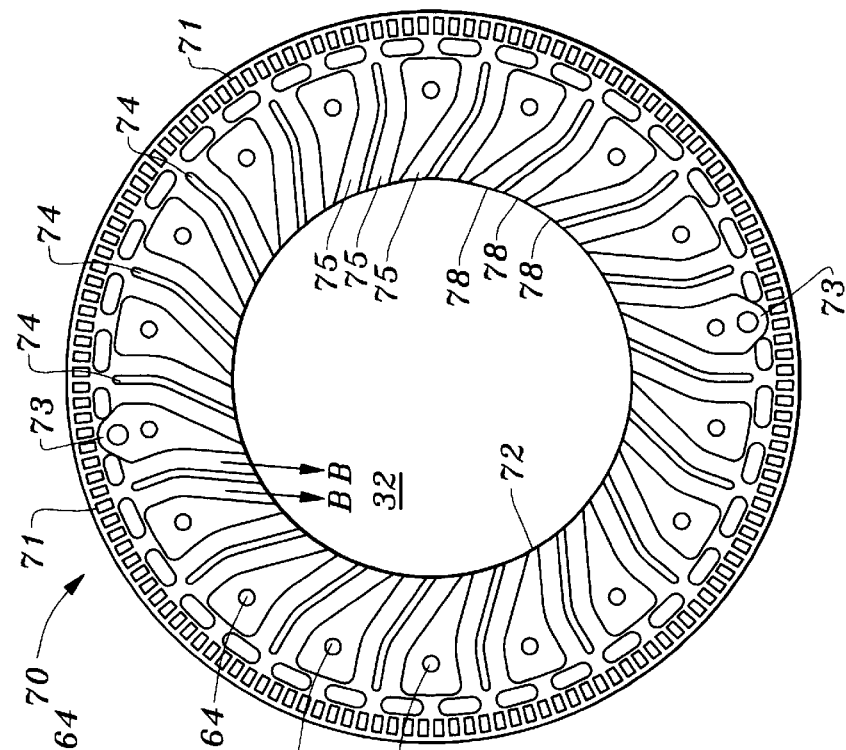
Figure 5:
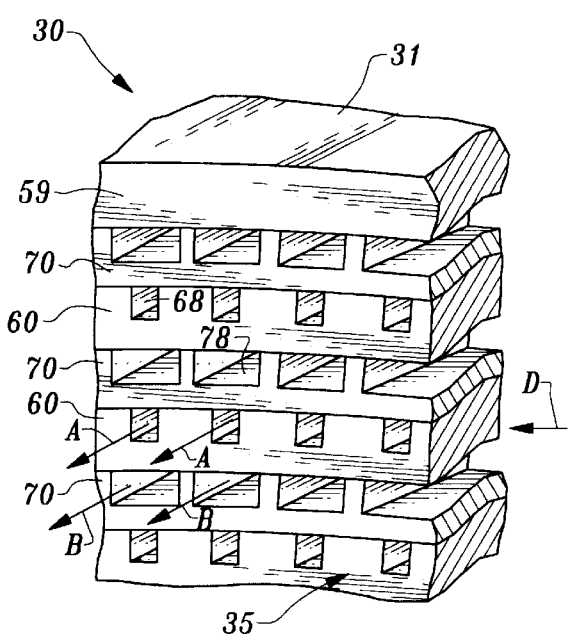

A first stack 30 of a series platelets (FIGS. 2–5) is also encapsulated by the housing 20. The first stack 30 has alternating fuel platelet 60 (FIG. 3) and oxidizer platelet 70 (FIG. 4) pairings joined integrally to from a single unit (FIG. 5). The first stack 30 has an annular shape with its longitudinal central axis preferably coincident with the centerline 2 of the injector assembly 10. The first stack 30 has common interfaces with each of the three chambers described above. The interfaces permit flow to pass between the first stack 30 and the chambers. An upstream surface 31 of the first stack 30 interfaces with the pre-chamber 28. This allows fuel to pass from the pre-chamber to the fuel platelet 60. An outside surface 33 interfaces with the peripheral chamber 26 and allows oxidizer to pass from the peripheral chamber 26 to the oxidizer platelet 70. An inner surface 35 of the first stack 30 interfaces with the upstream portion of the inner chamber 32, thereby allowing fuel and oxidizer exiting the first stack 30 to pass into the inner chamber 32. The first stack preferably includes ten or more fuel platelets 60 and ten or more oxidizer platelets 70, all formed into a single first stack 30 by diffusion bonding of the platelets 60.

Each fuel platelet 60 (FIG. 3) is preferably similar and has an annular shape with an outer edge 61 that forms part of the outside surface 33 of the first stack 30 adjacent the peripheral chamber 26. An inner edge 62 forms part of the inner surface 35 of the first stack 30 adjacent the inner chamber 32. Near the outer edge 61 is at least one, but preferably two, alignment holes 63 used to ensure that the fuel platelets 60 are each positioned in a predetermined manner with respect to other fuel platelets 60 and the oxidizer platelets 70 that constitute the first stack 30. The center of the alignments holes 63 of each fuel platelet 60 are positioned vertically equidistant from the centerline 2. The fuel platelets 60 are also positioned such that a straight line between the centers of the alignment holes 63 intersects the centerline 2 at an acute angle with a vertical line perpendicular to the centerline 2. The alignment holes 63, the line between the alignment holes 63, and the line perpendicular to the centerline 2 are all at the same downstream location along the centerline 2. In the preferred embodiment of this invention, there are two circular alignment holes 63 placed near the outer edge 61. However, other numbers, different shapes, and different locations for the holes 63 are acceptable. For example, there could be three holes 63 with diamond shapes located closer to the inner edge 62.

Figure 3:
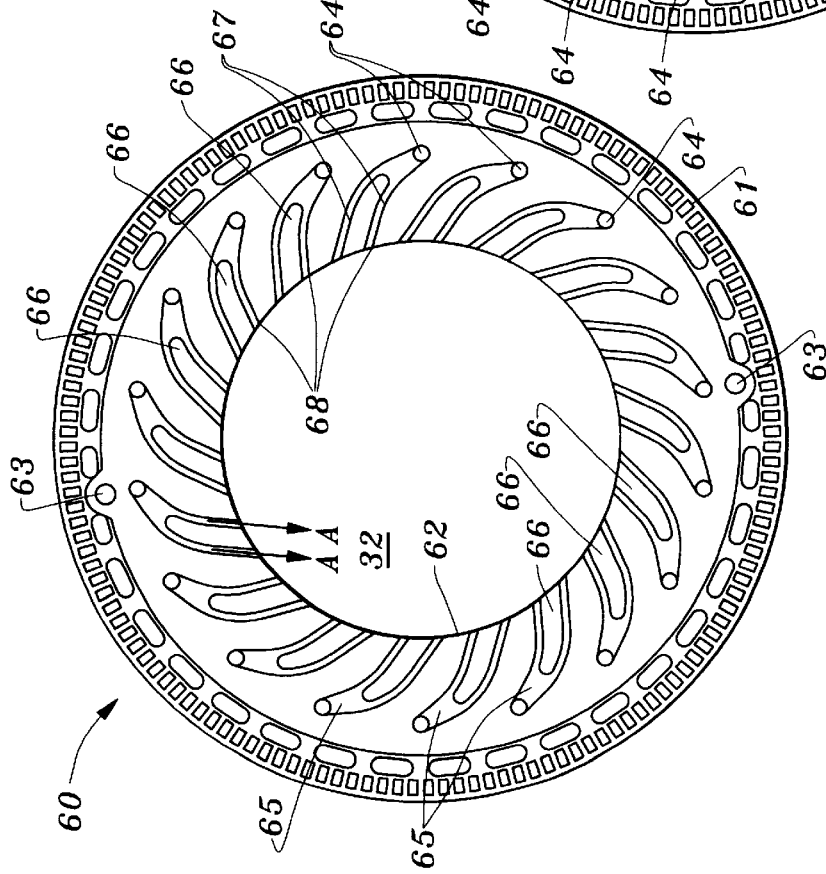

Located between the outer edge 61 and the inner edge 62 are a series of supply holes 64, troughs 65, separators 66, injection lines 67, and outlets 68 (FIG. 3). These components are evenly distributed radially on the fuel platelet 60. This distribution is preferably such that angles between coplanar lines determined by the centerline 2 and the area centroids of each of the components are equal as between like components. For example, lines between the centerline 2 and the supply holes 64 form equal angles about the centerline 2. The same is true for the troughs 65, the separators 66, the injection lines 67, and the outlets 68. However, the angles are not necessarily the same as between unlike components.

The supply holes 64 pass entirely through each fuel platelet 60, except optionally a most downstream fuel platelet, in order to provide a flow path for the fuel to flow to and through the adjacent, downstream oxidizer platelets 70. These supply holes 64 also pass through the oxidizer platelets 70 (FIG. 4). However, the troughs 65, the injection lines 67, and the outlets 68 are preferably depth-etched in the fuel platelet 60 to a depth less than the total thickness of the platelet 60. The separators 66 are the fuel platelet 60 material that remains after the troughs 65, the injection lines 67, and the outlets 68 are etched into the fuel platelet 60. As described in detail below, fuel can flow from each supply hole 64 into the adjacent trough 65 and then is split into one of the two injection lines 67 before exiting at one of the two outlets 68.

Immediately adjacent and downstream of the fuel platelet 60 is an oxidizer platelet 70 (FIG. 4). The oxidizer platelet 70 is integrally joined to two adjacent fuel platelets 60. Orientation holes 73 are in substantially the same peripheral location as the alignment holes 63 of the fuel platelet 60, thereby ensuring that predetermined geometric relationships between components of the platelets 60, 70 are maintained after they are integrally joined.

Located between an outside edge 71 and an inside edge 72 of the oxidizer platelet 70 are a series of dividers 74, radial pathways 75 and outputs 78. These components are evenly distributed radially on the oxidizer platelets 70 in like manner to the fuel platelet 60 components. Unlike the fuel platelet 60 components which are all interior to the outer edge 61, the radial pathways 75 extend from the output 78 to the outside edge 71 where the pathways 75 are open to the peripheral chamber 26. Hence, oxidizer can flow from the peripheral chamber 26 to the inner chamber 32 by way of one of the radial pathways 75

The fuel platelets 60 and oxidizer platelets 70 are integrally joined as shown in FIG. 5 to form the first stack 30. The inner surface 35 of the first stack 30 is formed by the alternating inner edges 62 and inside edges 72 of the platelets 60, 70. A top plate 59 integrally joined to the oxidizer platelet 70 farthest upstream encloses the top of the etched radial pathways 75 to form oxidizer pathways between the peripheral chamber 26 and the inner chamber 32. In like manner, the oxidizer platelet 70 upstream of the succeeding fuel platelet 60 encloses the top of the etched injection lines 67 to form fuel pathways 76 between the supply holes 64 and the inner chamber 32.

The inner surface 35 of the first stack 30 (formed by the inner edges 62 and inside edges 72) interfaces with the inner chamber 32. In turn, the inner chamber 32 interfaces with a second stack 80 (FIGS. 2 and 6) further downstream. The inner chamber 32 combined with the first stack 30 provides a preferred form of the first mixer (FIG. 1) for the fuel and the oxidizer.

Figure 10:
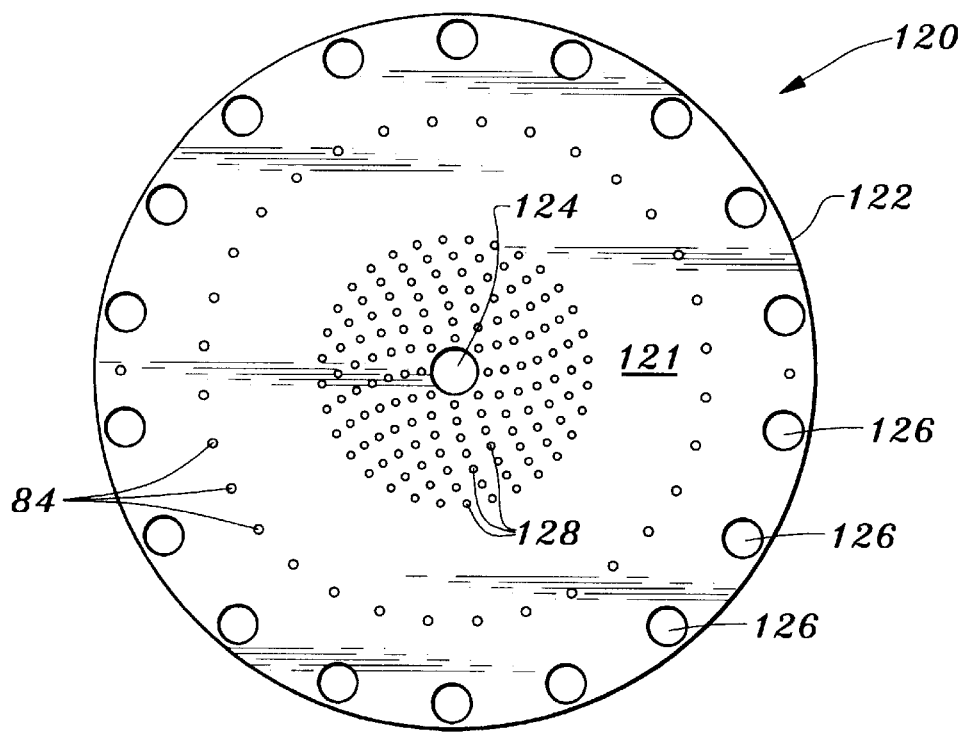
Figure 11:
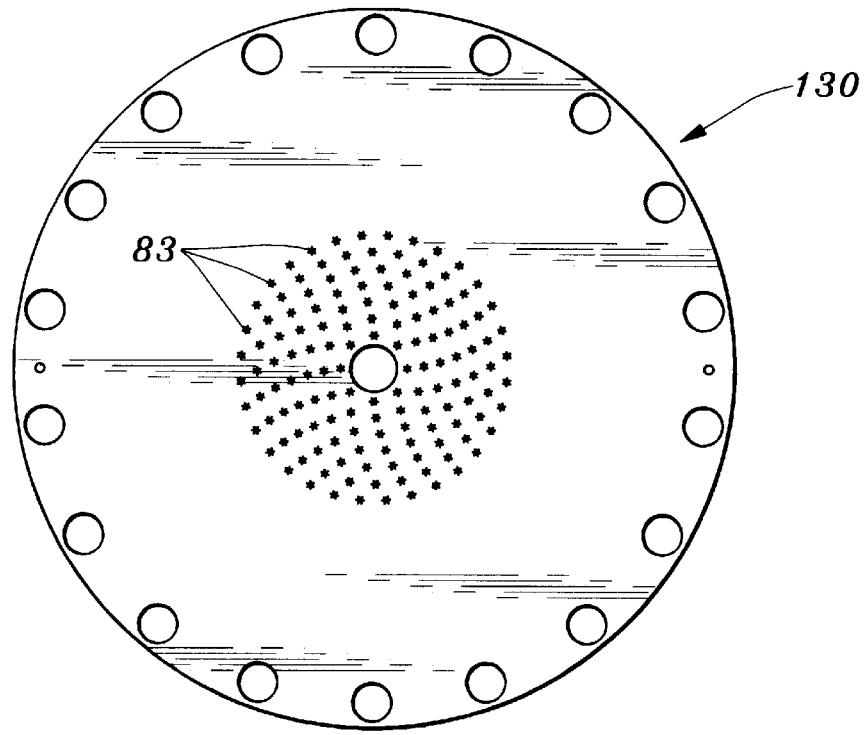
Figure 12:
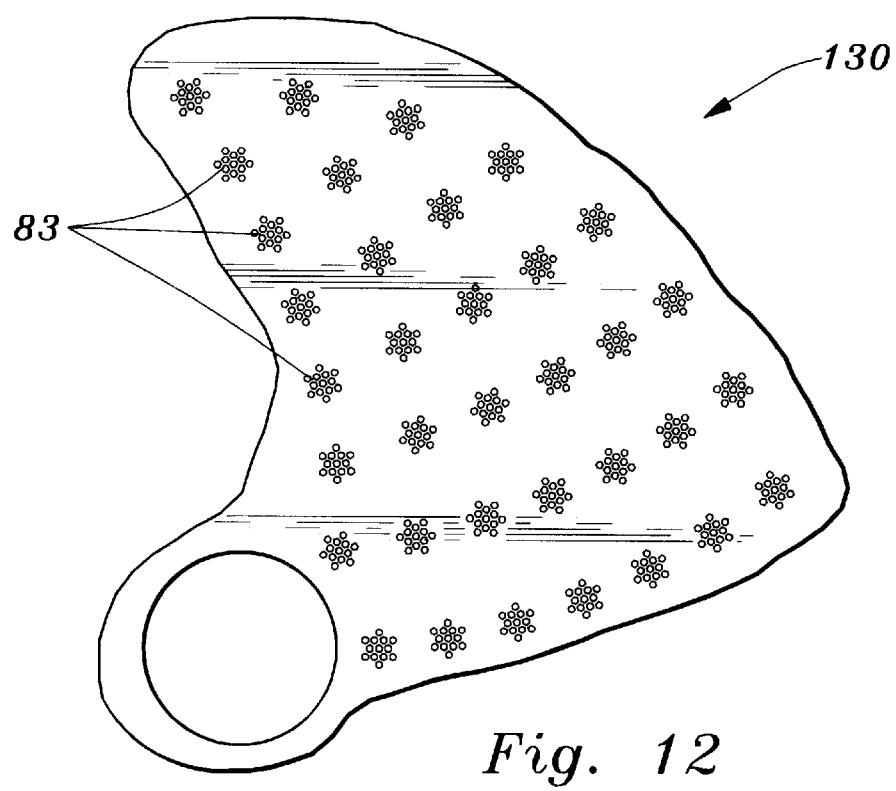
Figure 13:
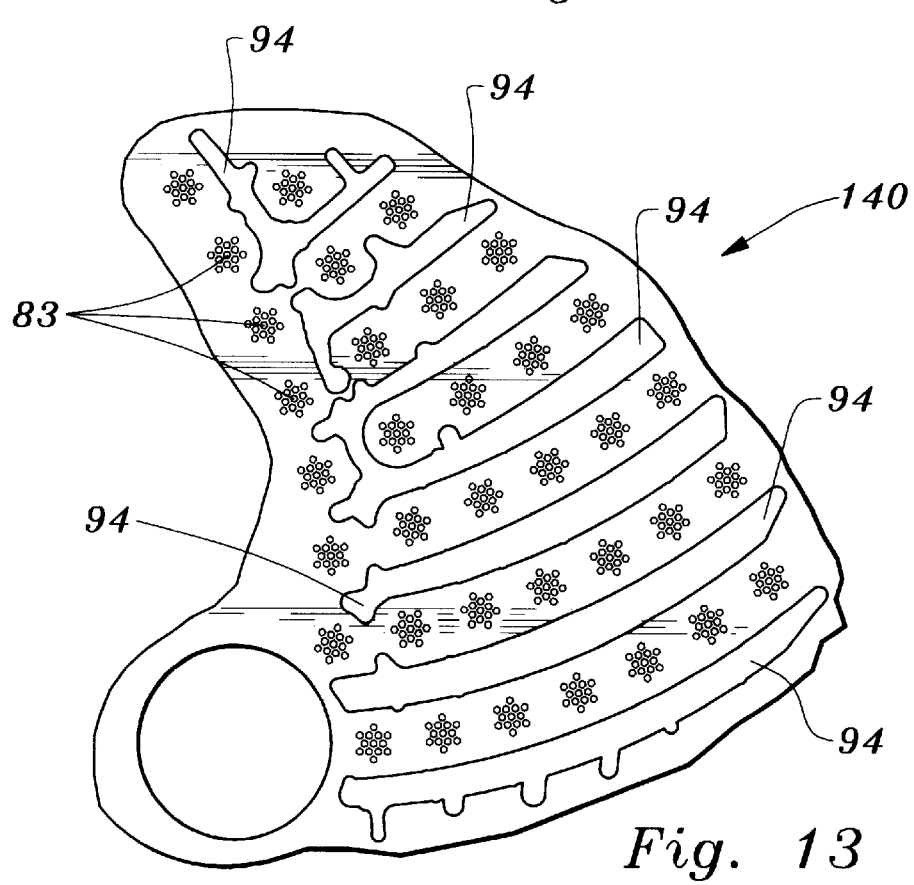
Figure 14:
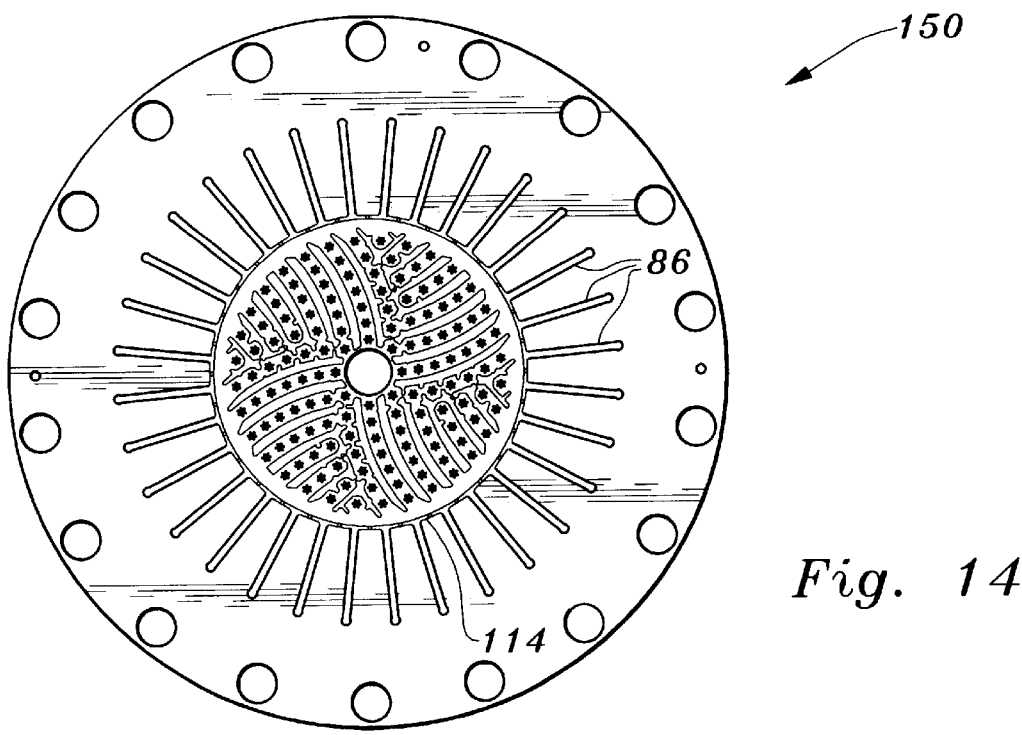
Figure 15:
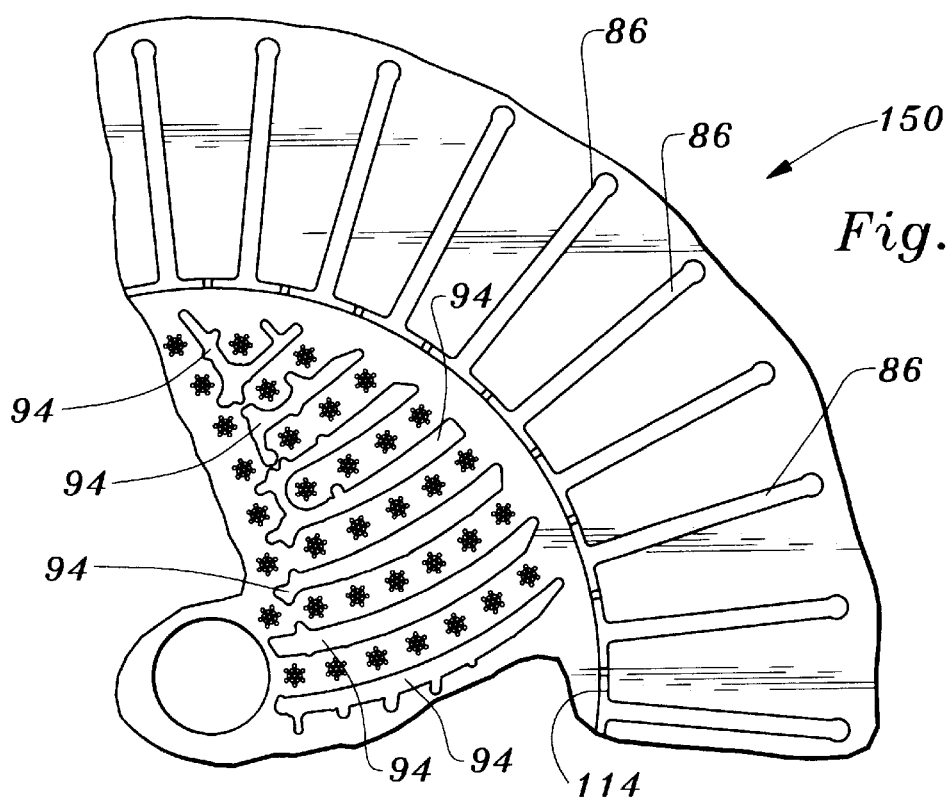
Figure 16:
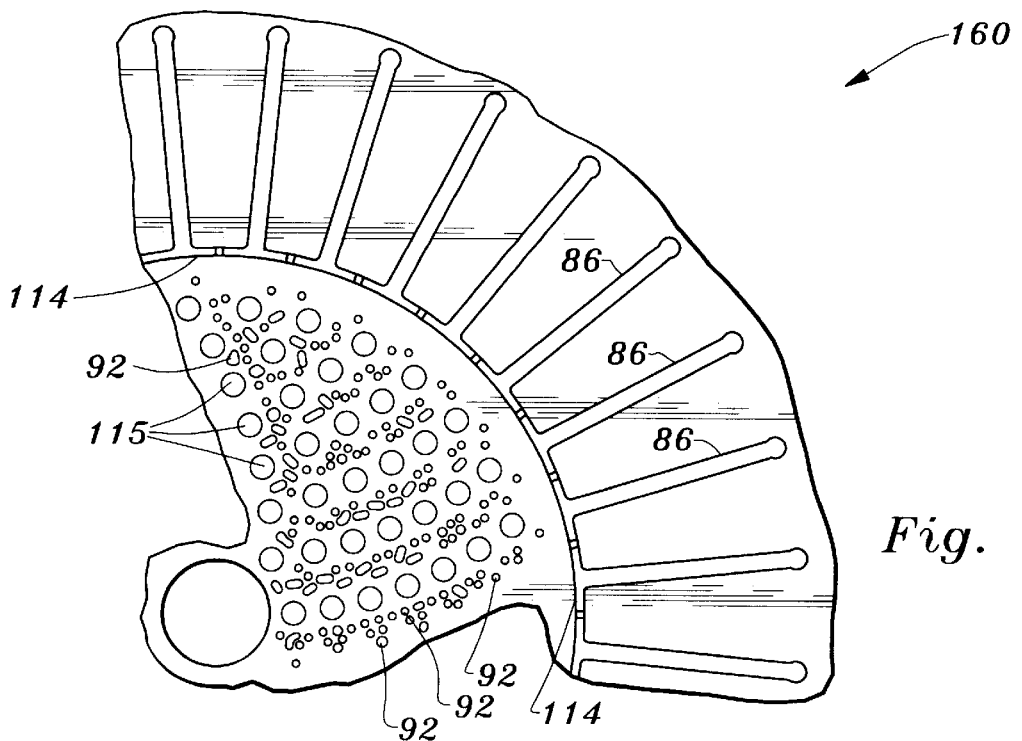

The second stack 80 is secured between the housing 20 and the flange 16 by the bolts 18 that pass through the bolt holes 36 (FIG. 10) and provides a form of the second mixer (FIG. 1) for the fuel/oxidizer mixture and water or other coolant. The bolt holes 36 are distributed around the periphery of the second stack 80. The second stack 80 is properly oriented between the housing 20 and the flange 16 by means of at least one alignment hole 82 (FIGS. 10 and 11).

Figure 6:
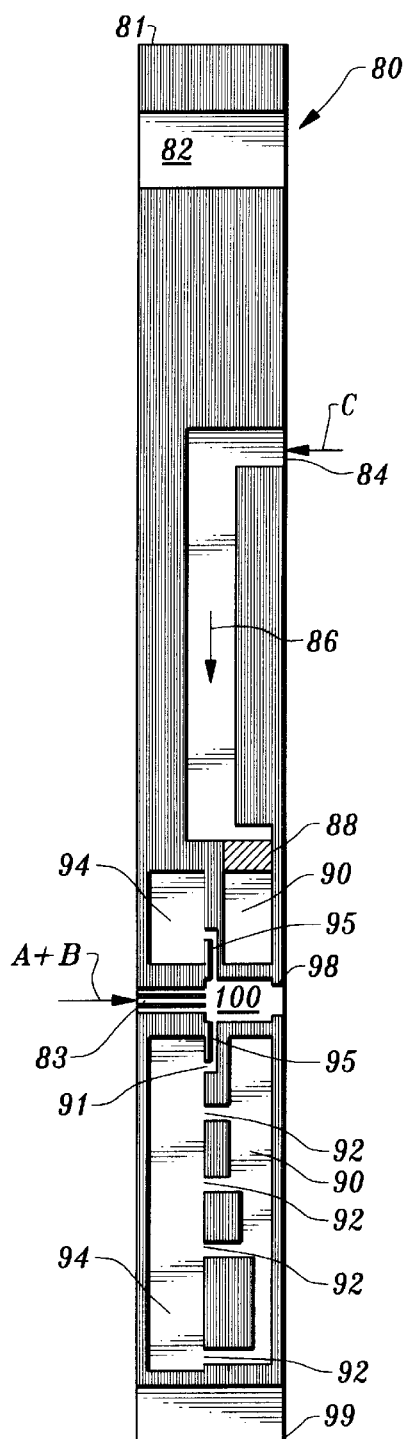
Figure 7:
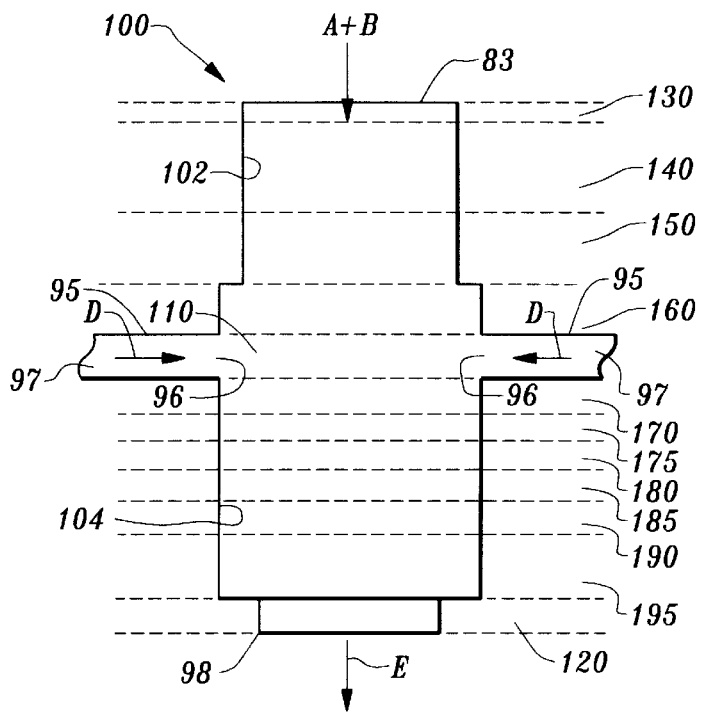

The second stack 80 is preferably comprised of twelve platelet designs 110, 120, 130, 140, 150, 160, 170, 175, 180, 185, 190, 195 with various complex etched patterns as shown in FIGS. 10–24. Some platelet designs repeat to add thickness to the stack 80. The etched patterns form entry points, flow paths and components for the reactants and coolant to enter, flow through, be mixed and blended within, and exit the second stack 80 through a series of injection elements 98 (FIGS. 6 and 7). The first of the platelets in the second stack 80 is upstream of the remaining second stack 80 platelets and is essentially adjacent the perpendicular, downstream, portion of the housing 20 outer surface 21. A circular seal 39 is compressed between the housing and the upstream side of the first platelet in the stack 80.

A series of reactant inlets 83 are distributed on the first platelet 130 of the second stack 80. The reactant inlets 83 are relatively small diameter preferably equilateral hexagon-shaped holes positioned radially on the second platelet such that all the reactant inlets 83 are within the radial limits of the inner chamber 32. The downstream end of the reactant inlets 83 interface with a series of mixing cups 100 (FIG. 7), thereby providing a flow path for the reactants to travel from the inner chamber 32 to the mixing cups 100. Thirteen inlets 83 preferably lead from the inner chamber 32 to each mixing cup 100. The reactants are mixed with coolant water after it has flowed from a source of water 85 (FIG. 1), through the second stack 80 and into the mixing cup 100. Preferably seven concentric rows of mixing cups 100 are located within the second stack 80 with eight cups 100 in the innermost row and thirty-two cups 100 in the outermost row. The mixing cups 100 are arranged so that the circumferential distance between them is approximately the same just as the radial distance between them is the same to assure uniform mass and energy distribution or release into the combustion chamber.

Water enters the second stack 80 through a series of water inlets 84 located on the downstream side of the last platelet in the second stack 80. This last platelet is the face plate 120 adjacent the combustion chamber 12. The water inlets 84 are holes in the platelet located at equal distances from and equal angles about the centerline 2. The centers of the water inlets 84 are between the alignment holes 82 and mixing cups 100 radially from the centerline 2.

The water then flows through a series of distribution channels 86 (FIGS. 6 and 14–20). The channels 86 are cavities formed within certain platelets in the second stack 80 that conduct the water initially upstream, then turns it radially inward substantially perpendicular to the centerline 2, and then turn it in the downstream direction parallel to the centerline 2. The water then passes through a filter 88 before entering a lower manifold 90. The lower manifold 90 conducts the water near and along a face plate 120 where it absorbs heat from the faceplate 120. The heated water is passed from the lower manifolds 90 to an upper manifold 94 through a series of raiser holes 92. The heated water exits the upper manifold 94 and enters an inflow end 97 of a skewed input 95. The skewed input 95 carries water to an outflow end 96 which opens into the mixing cup 100 for mixing and blending with the pre-mixed reactants.

Each mixing cup 100 (FIG. 7) consists of the series of preferably thirteen inlets 83 (FIGS. 6, 7 and 12) adjoined to a lower cylindrical cavity 104 located immediately downstream. The inlets 83 are formed by cutting equal sized holes in the first 3 platelets of the second stack 80. The downstream, lower cylindrical cavity 104 is formed by larger diameter holes in the next 8 downstream platelets. The last platelet in the second stack 80 contains a series of injection elements 98 which interface with an adjacent side of a face plate 120 (FIG. 10). Details of the face plate 120 are discussed below.

Figure 8:
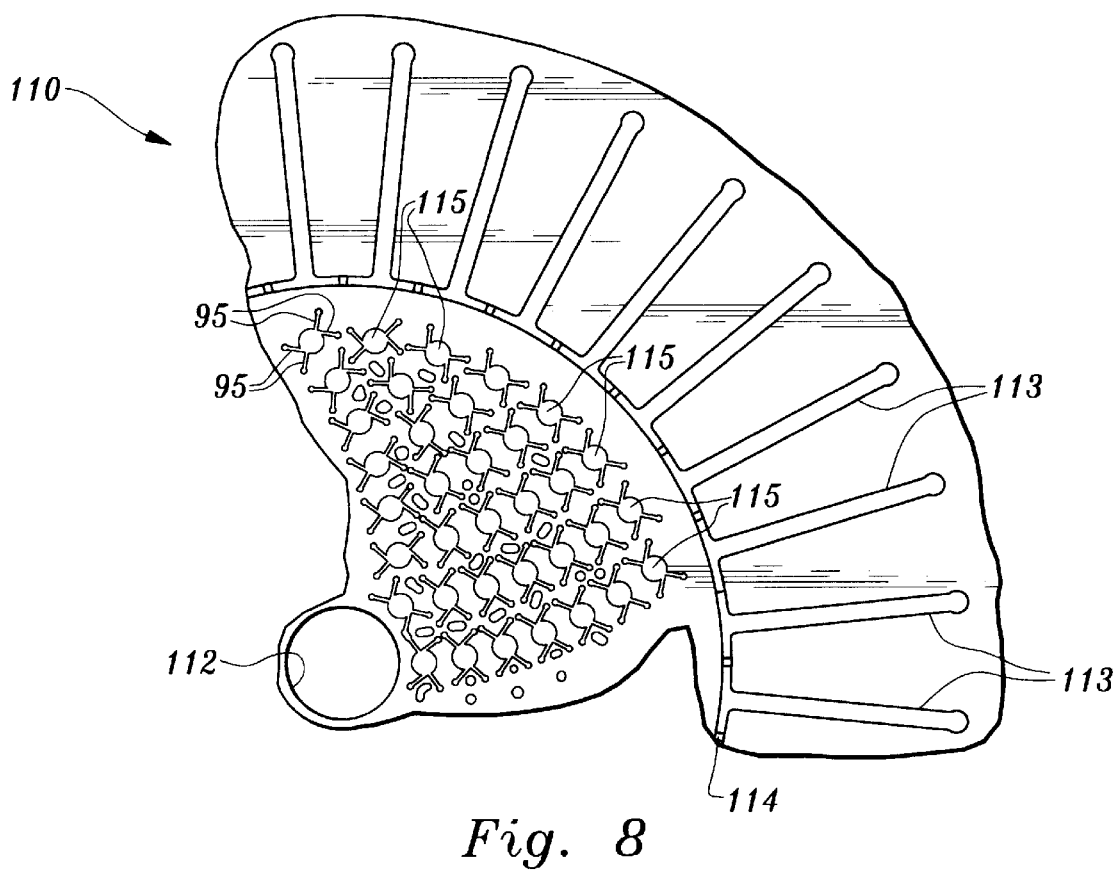
Figure 9:
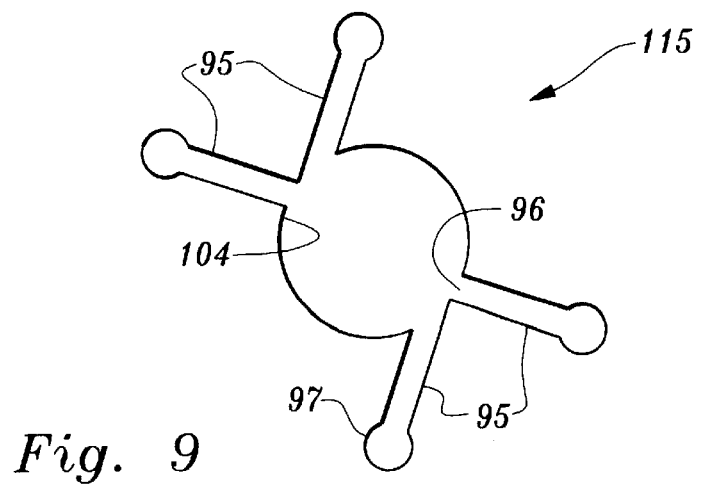
Figure 17:
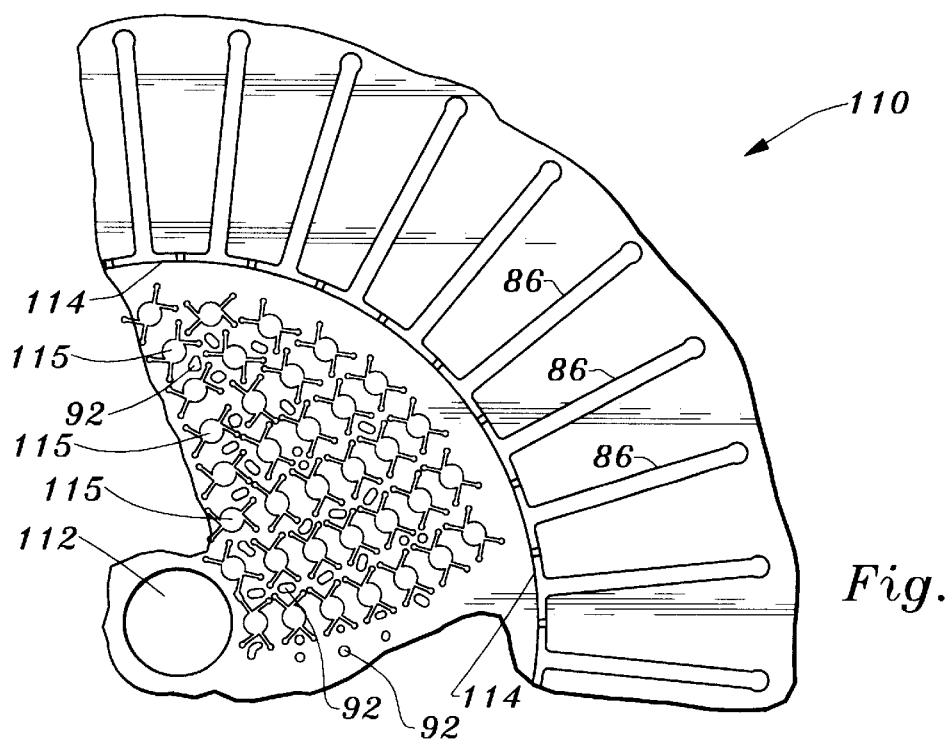
Figure 18:
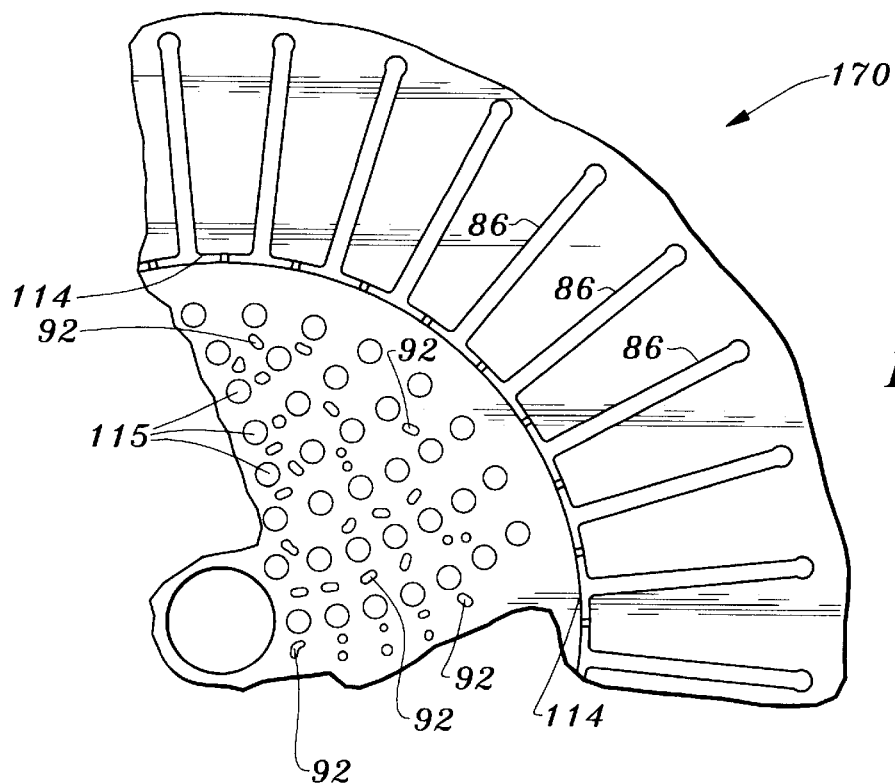
Figure 19:
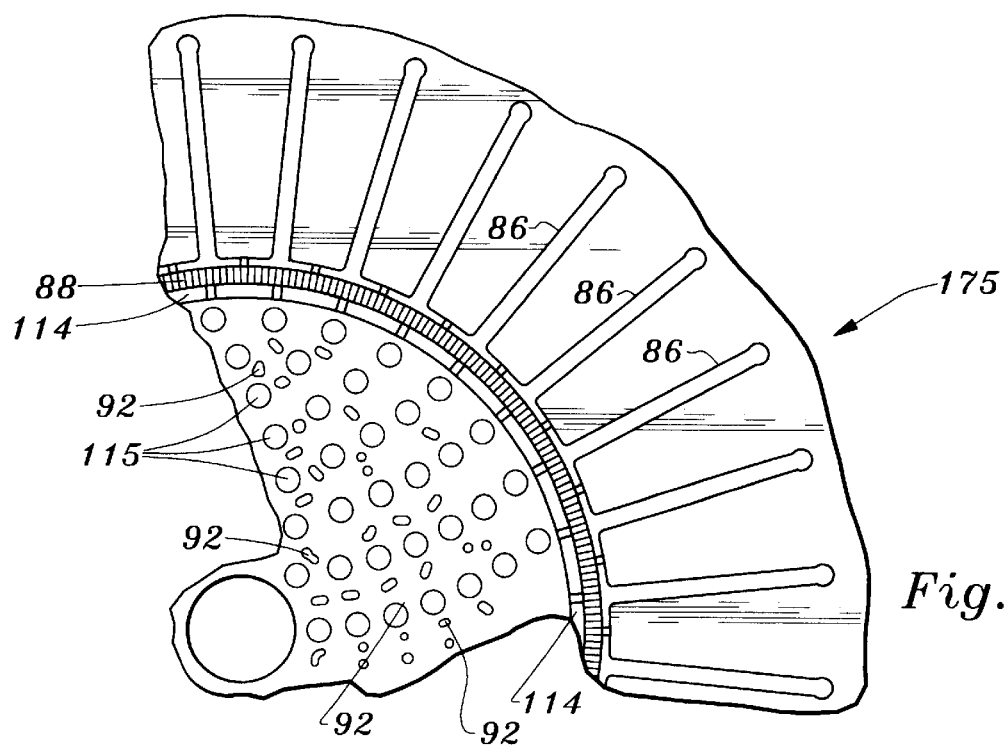
Figures 20, 21:
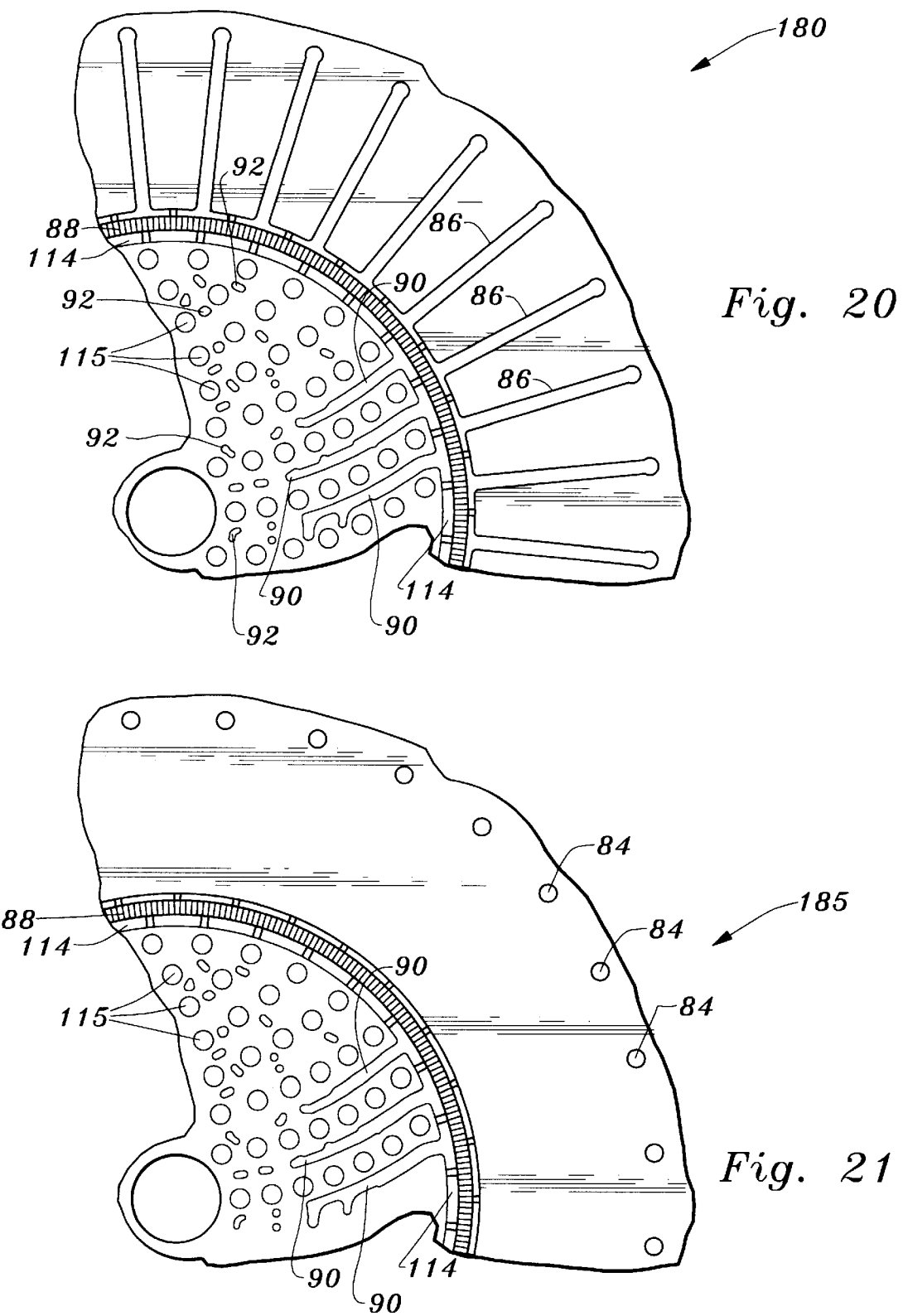
Figure 22:
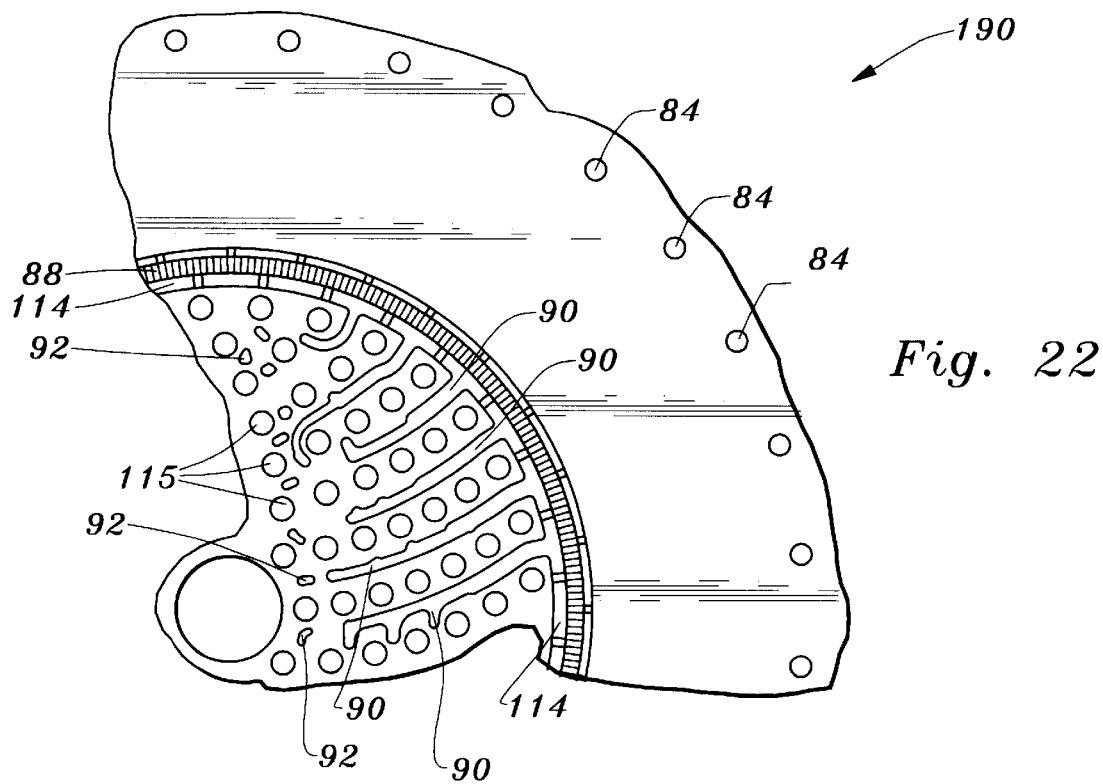
Figure 23:
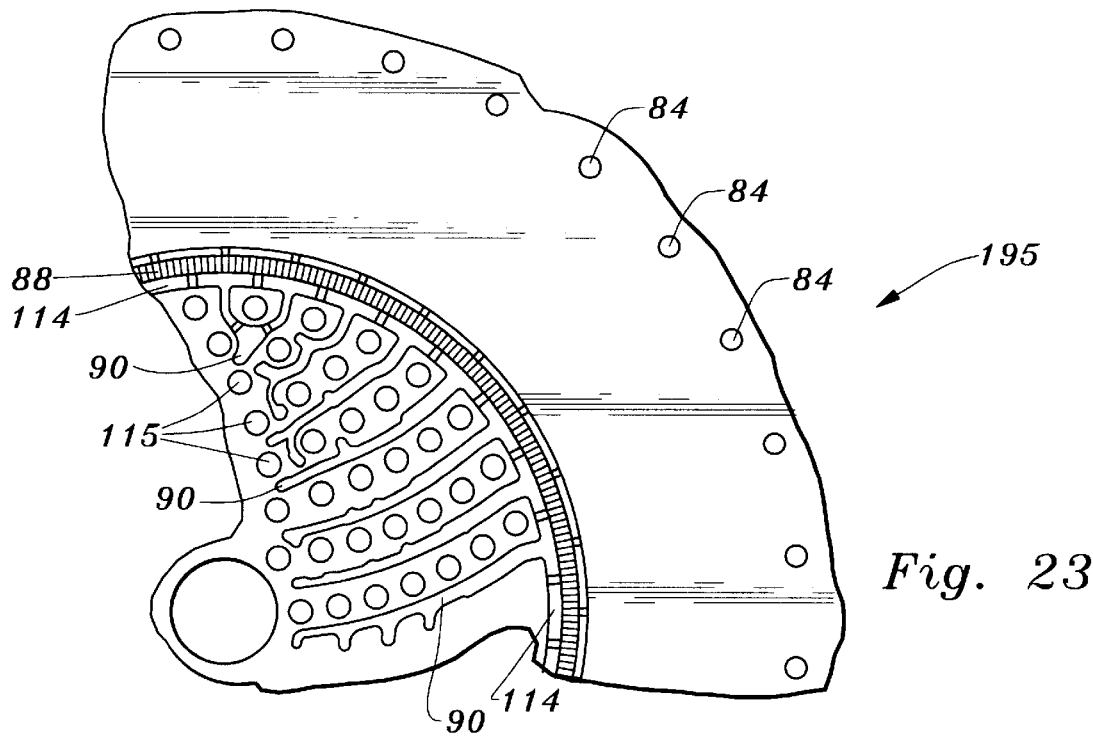
Figure 24:
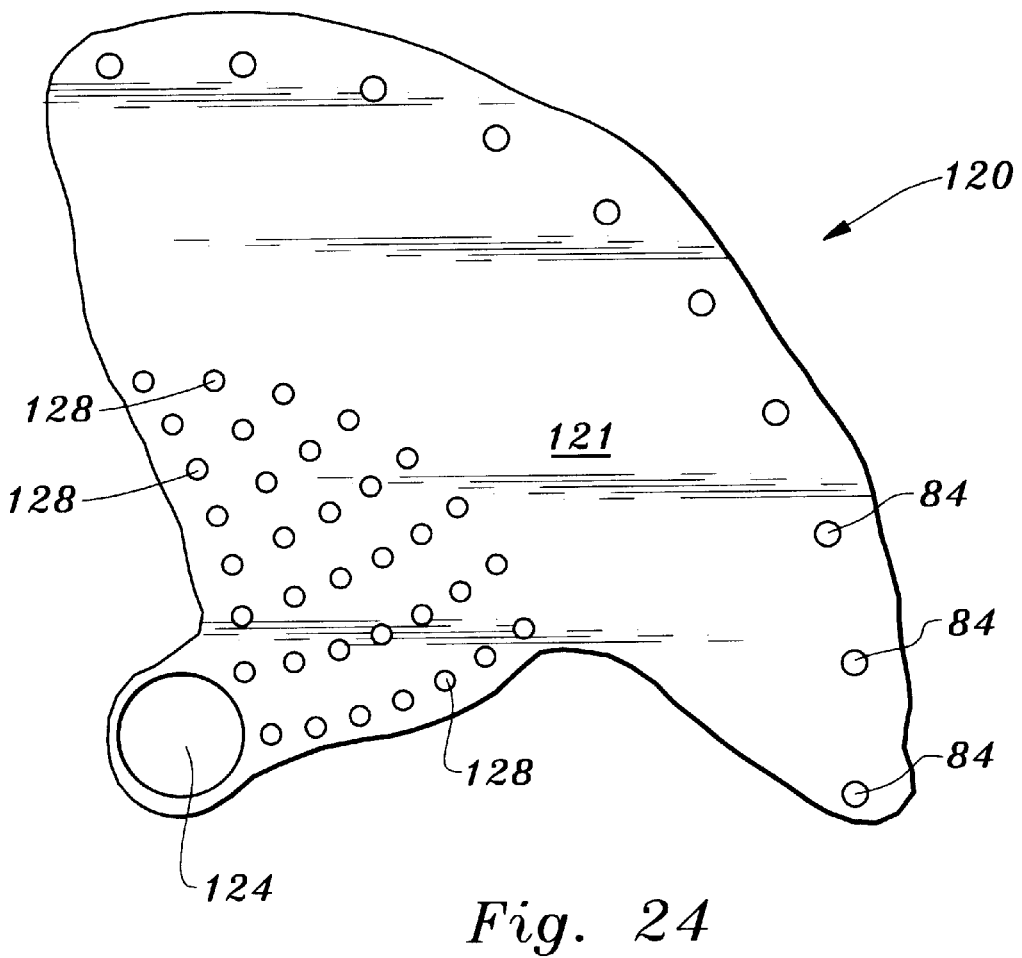

The fifth platelet in the second stack 80 is a mixing platelet 110 (FIGS. 8, 9, and 17). It has a circular, peripheral edge and a circular bore 112 about the centerline 2. The bore 112 is about the geometric center of the mixing platelet 110. The distribution channels 86 extend from radial locations essentially coincident with the location of the water inlets 84, thereby providing flow paths for the water between the water inlets 84 and a circumferential conduit 114.

The conduit 114 is a series of circumferential cavities that are defined in the plane of the mixing platelet 110 by a series of circumferential slits. The slits constitute the inmost portion of the distribution channel 86, thereby providing a flow path between the radial portion of the channel 86 and the filter 88. Etched in the fifth platelet and adjacent platelets is a series of mixing holes 115 aligned holes 115 of adjacent platelets and distributed radially. Each set of the aligned mixing holes 115 from one of the mixing cups 100 where the reactants are mixed and blended with the water. The water enters the mixing region of the cup 100 perpendicular to the streamwise flowing reactants through the skewed inputs 95 (FIGS. 7 and 9).

In the preferred embodiment of this invention, there are four skewed inputs 95 in each mixing cup 100. Two of the skewed inputs 95 direct water to flow tangentially along a lower cavity surface 104. The remaining two skewed inputs 95 direct water flow perpendicular to the lower cavity surface 104. However, other numbers of skewed inputs 95 directing flow at different angles relative to the lower cavity surface 104 are acceptable. By skewing the inputs 95, blending of the water with the fuel and oxidizer is enhanced.

The injection elements 98 are formed in a face plate 120 (FIGS. 10 and 24) located immediately downstream from the mixing cups 100. A face 121 of the face plate 120 provides closure of an upstream end 13 of the combustion chamber 12. The face plate 120 is the last platelet of the second stack 80. The bolts 18 pass through a series of bolt holes 126. A perimeter 122 defines the radial bounds of the face plate 120. The holes through which the bolts 18 pass are located on this perimeter 122. About the center line 2 of the face plate 120 is a firing hole 124 through which an ignition source causes combustion to commence in the combustion chamber 12 after the reactant/water mixture enters the chamber 12 through the mixture outlets 128.

In use and operation of the preferred embodiment of this invention, there are substantially no moving parts. However, herein is described the flow sequence of events as the reactants and coolants flow from their respective sources until the combustion species reach the exhaust end 19 of the combustion chamber 12.

The onset of fluid flow from the water source 15, the oxidizer source 40, and the fuel source 50, is initiated at approximately the same time. The oxidizer and fuel flow generally downstream through their respective feed lines and tips. The fuel passes substantially axially through the pre-chamber 28 and enters the fuel platelets 60 of the first stack 80 by way of the supply holes 64. The fuel passes substantially axially through the troughs 65 and is separated into two streams of flow by the separator 66. The two streams of flow travel in substantially parallel paths through the injection lines 67. The fuel streams then exit the fuel platelet 60 at the outlets 68 and enter the inner chamber 32 in the direction shown by the arrows labeled A (FIGS. 3 and 5).

During a time period of substantially the same as required for the process just described, the oxidizer flows into the inner chamber 32 through a different flow circuit. The oxidizer passes, in order, substantially axially through the fore-chamber 24, the neck 25, and the peripheral chamber 26. It enters the oxidizer platelet 70 radially around the outside edge 71, and is divided into two streams of flow by a series of dividers 74. The two streams of flow traveling substantially parallel paths through the radial pathways 75. The oxidizer streams then exit the oxidizer platelet 70 at the outputs 78 and enter the inner chamber 32 in the direction shown by the arrows labeled B (FIGS. 4 and 5).

The oxidizer and fuel are injected into the inner chamber 32 at angles not perpendicular to the centerline 2 (as indicated by arrows A and B respectively). The angular injection of the reactants tends to induce a swirling effect in the inner chamber 32 and promotes mixing of the fuel and oxidizer. Furthermore, the fuel and oxidizer enter the inner chamber 32 in alternating layers, thereby inducing tangential shearing forces between layers. This further promotes thorough mixing.

The mixed reactants are then turned substantially axially downstream by the inner chamber 32 toward the reactant inlets 83 of the second stack 80 in the direction shown by the single arrow A+B. The reactants then flow into the mixing cups 100.

In the preferred embodiment of this invention, the overall mixture ratio is substantially stoichiometric. However, the mixture ratio may vary. The variation of the mixture ratio can be controlled by varying the basic geometry of the outlets 68 and outputs 78, by changing the flow rates of the fuel and oxidizer as a function of source pressure, or by changing the number of outlets 68 and outputs 78 through which fluid flows.

For instance, if the fuel is methane and the oxidizer is oxygen a stoichiometric oxidizer to fuel mixture ratio would be two to one (by gas volume, four to one by weight). Such a stoichiometric mixture ratio is illustrated in FIG. 5 by showing the oxidizer outputs 78 twice as large as the fuel outlets 68. If a lean mixture is desired with excess oxidizer, the cross-sectional area of the oxidizer output 78 can be increased or the cross-sectional area of the fuel outlet 68 can be decreased. Alternatively, a lean mixture can be provided by elevating the oxidizer flow rate relative to the fuel flow rate or by providing more oxidizer outputs 78 than fuel outlets 68.

Using these parts and characteristics, the mixture ratio for a given set of reactants and combustion conditions can be optimized. This in turn allows the energy release and combustion product species creation to be optimized. The same parts can also be used to maximize mixing by affecting the turbulence induced by the flow into the inner chamber.

Over a period of time substantially concurrent with the flow of the reactants, water is entering the second stack 80 in the direction of the arrows labeled C (FIGS. 2 and 6) through the water inlet 84. The water travels through the second stack 80, by way of the distribution channels 86, filter 88, lower manifold 90, raiser holes 92, upper manifold 94, and into the inflow end 97 of the skewed input 95 in the direction shown by the arrows labeled D (FIGS. 7 and 9). The water travels through the skewed inputs 95 and enters the mixing cup 100. Here the water, which by now is substantially atomized, mixes and blends with the reactants in a substantially perpendicular flow direction (as indicated by arrows A+B and arrows D). This perpendicular joining of reactants and atomized water flows, along with circumferential water flow induced by a pair of skewed inputs 95 in each mixing cup 100 (see FIG. 9), ensures substantially complete mixing and blending of the reactants in water.

After the reactants and water are atomized and blended in the mixing cups 100, the mixture of flows exits the mixing cups 100 through the injection elements 98 in the direction of the arrow labeled E. From this point, the mixture enters the combustion chamber 12 through the mixture outlets 128 where the mixture is ignited by an ignition source within the firing hole 124.

An alternative injector assembly 210 (FIG. 25) is a second embodiment of this invention. A block 220, a burn chamber 212, an oxidizer source 240, a fuel source 250, a water platelet 280, and a face plate 290 are analogous in form and function to like components in the preferred injector assembly 10.

A swirl cup 260 in conjunction with a diffusion plate insert 270 perform a like function to the first stack 30 of the preferred injector assembly 10. However, the swirl cup 260 and the insert 270 do not use a platelet stack and inner chamber 32 to mix the reactants.

The oxidizer source 240 supplies oxidizer to an oxidizer dome 242. The dome 242 is formed by a dome wall 244 (with a hollow, part spherical shape) integrally joined to the upstream side of the block 220. The block 220 has a series of oxidizer entries 262. The entries 262 are holes drilled between the upstream side of the block 220 and the swirl cup 260. The entries 262 have a cylindrical shape over a substantial portion of their length, a tapered section, and a smaller diameter section that opens into the swirl cup 260. Oxidizer flows substantially axially through the entries 262 but twisting helically at preferably a 45° angle to axial and into the swirl cup 260. The flow is substantially parallel to a center axis 202 of the alternative injector assembly 210.

Concurrently, the fuel source 250 supplies fuel to a fuel injector 264 embedded in the block 220. The fuel injector 264 has a hollow annular shape encircling the swirl cup 260. Fuel flows through the injector 264 and into the swirl cup 260 in a tangential direction substantially perpendicular to the center axis 202. As such, the oxidizer and fuel streams converge at right angles, thereby causing substantial mixing of the two reactants.

The swirl cup 260 is an irregularly shaped cavity embedded in the block 220. The swirl cup 100 has an outer cavity 266 that receives the oxidizer and fuel and is where initial mixing occurs. It also has an inner cavity 267 formed between a portion of the block 220 surface and a portion of the surface of a swirl vane 268. The swirl vane 268 is preferably a monolithic structure with a cross-sectional shape generally resembling a hook. The reactants flow from the outer cavity 266 to the inner cavity 267 and into an upper reactant chamber 269. During this flow process the reactant flow changes general flow direction from generally downstream, to perpendicular to and toward the central axis 202, to generally upstream and away from the center axis 202, to perpendicular to and toward the center axis 202. These flow direction changes are a result of forcing the reactant flow to follow the swirl vane 268.

After the reactants exit the inner chamber 267 and enter the upper reactant chamber 269, the flow is accelerated through a converging section of the upper reactant chamber 269 formed by a portion of the interior vane surface 263. The flow is then decelerated downstream by the remaining portion of the interior vane surface.

At this point, the flow passes through the diffusion plate insert 270, which traverses the upper reactant chamber perpendicular to the center axis 202. The insert 270 is preferably a flat plate that has drilled through it a series of reactant holes 272. The reactant holes 272 in this embodiment have a constant diameter cross-section and allow the reactants to flow from the upper reactant chamber 269 to a lower reactant chamber 274. However, other shapes of reactant holes such as slightly converging or slightly diverging are acceptable.

The reactant flow then enters a water platelet 280. The mixing and blending of the reactants in water in the water platelet, the injection of the mixture into the burn chamber 212, and the combustion process is substantially the same as in the preferred injector assembly 10. However, for this 1 MW embodiment a smaller number of mixing cups would typically be utilized This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure. When structures are identified as a means to perform a function, the identification is intended to include all structures which can perform the function specified.

What is claimed is:

1. An injector and combustion chamber assembly for mixing and delivering reactants including fuel and an oxidizer along with water into the combustion chamber, the assembly comprising in combination:

a fuel inlet coupled to a source of fuel;

an oxidizer inlet coupled to a source of oxidizer;

a water inlet coupled to a source of water;

a face oriented adjacent the combustion chamber and facing the combustion chamber, said face including at least one outlet for a mixture of the fuel, the oxidizer and the water;

a mixer for the fuel, the oxidizer, and the water, said mixer located upstream from said outlet;

said face located between said mixer and said combustion chamber;

wherein said mixer includes multiple separate fuel pathways located downstream from said fuel inlet, each said fuel pathway leading to a separate fuel outlet, and multiple separate oxidizer pathways located downstream from said oxidizer inlet, each said oxidizer pathway leading to a separate oxidizer output, said fuel outlets and said oxidizer outputs oriented to discharge the fuel and the oxidizer into a common mixing region;

wherein said common mixing region for the fuel and the oxidizer is located upstream from said water inlet, such that the fuel and the oxygen are mixed together first before the water is mixed with the fuel and the oxidizer by said mixer; and wherein said multiple separate fuel pathways are located within a series of planar fuel platelets and wherein said multiple separate oxidizer pathways are located within a series of planar oxidizer platelets, said fuel platelets stacked in an alternating arrangement with said oxidizer platelets.

2. An injector and combustion chamber assembly for mixing and delivering reactants including fuel and an oxidizer along with water into the combustion chamber, the assembly comprising in combination:

a fuel inlet coupled to a source of fuel;

an oxidizer inlet coupled to a source of oxidizer;

a water inlet coupled to a source of water;

a face oriented adjacent the combustion chamber and facing the combustion chamber, said face including at least one outlet for a mixture of the fuel, the oxidizer and the water;

a mixer for the fuel, the oxidizer, and the water, said mixer located upstream from said outlet;

said face located between said mixer and said combustion chamber;

wherein said mixer includes a first reactant mixer for the fuel from said fuel inlet and the oxidizer from said oxidizer inlet, and a second mixer for mixing water from said water inlet with a reactant mixture discharged from said first reactant mixer;

wherein said mixer includes multiple separate fuel pathways located downstream from said fuel inlet, each said fuel pathway leading to a separate fuel outlet, and multiple separate oxidizer pathways located downstream from said oxidizer inlet, each said oxidizer pathway leading to a separate oxidizer output, said fuel outlets and said oxidizer outputs oriented to discharge the fuel and the oxidizer into a common mixing region; and wherein said face includes mixture outlets passing through said face and into the combustion chamber for the fuel, oxygen and water mixture, and wherein said face additionally includes cooling holes passing therethrough which do not exit said face and into the combustion chamber, said cooling holes remaining spaced from said mixture outlets.

3. A method for delivering reactants and water into a combustion chamber, including the steps of:

receiving fuel from a source of fuel;

receiving oxidizer from a source of oxidizer;

mixing the fuel from the source of fuel and the oxidizer from the source of oxidizer together before directing the fuel and the oxidizer into the combustion chamber;

receiving water from a source of water;

blending the water from the source of water with a fuel and oxidizer reactant mixture resulting from said mixing step before directing the fuel, oxidizer and water into the combustion chamber;

directing the water, fuel and oxidizer mixture into the combustion chamber;

wherein said mixing step includes the steps of dividing the fuel into separate fuel passageways, at least two of the passageways leading to a separate fuel outlet and dividing the oxidizer into separate oxidizer passageways, at least two of the passageways leading to a separate oxidizer output;

locating the fuel outputs and the oxidizer outputs adjacent a mixing region; and wherein said mixing step includes the step of sizing the fuel outlets and the oxidizer outlets to have a size ratio of the sum of all of the fuel outlets to the sum of all of the oxidizer outlets similar to a preselected reactant mixture ratio for the fuel and the oxidizer.

4. The method of claim 3 wherein said sizing step includes sizing the fuel outlets and the oxidizer outputs so that the ratio of the sizes of all of the fuel outlets to the sizes of all of the oxidizer outputs matches a stoichiometric ratio for substantially complete combustion of the fuel with oxidizer.

5. The method of claim 3 wherein said blending step includes the steps of splitting the water from the source of water into multiple separate conduits and splitting a reactant mixture of the fuel and oxygen from the mixing region into multiple separate reactant passageways; and inputting water from the multiple separate water conduits into at least one of the reactant pathways for mixing of the water with the fuel and oxygen reactant mixture.

6. The method of claim 3 wherein said directing step includes the steps of:

passing the blended water, fuel and oxidizer through a face of the combustion chamber and into the combustion chamber;

delaying combustion of the reactants until after the reactants enter the combustion chamber; and combusting the reactants together within the combustion chamber with the water present.

7. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein a ratio of the sum of all of said fuel outlet cross-sectional areas and the sum of each of said oxidizer output cross-sectional areas matches a preselected fuel and oxidizer reactant mixture ratio.

8. The system of claim 7 wherein said preselected fuel and oxidizer mixture ratio is a substantially stoichiometric ratio for complete combustion of said fuel with said oxidizer.

9. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region;

a water inlet coupled to a source of water;

means for blending the reactant mixture with the water;

said face located downstream from said means for blending the reactant mixture with the water, such that the water is blended with the reactant mixture before the water from said water inlet passes beyond said face; and wherein said water inlet is split into multiple separate conduits said conduits leading to separate outflow ends adjacent a region where the fuel and oxidizer mixture is present, said outflow end of each said conduit having a cross-sectional area and water flow rate therethrough which correlates to a cross-sectional area and flow rate of the fuel and oxidizer mixture passing by said outflow end of said conduit at a blending ratio which matches a preselected ratio of water to fuel and oxidizer mixture, such that a desired mixture of fuel, oxidizer and water is blended together before passing through said face and into the combustion chamber.

10. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet, a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein said multiple separate fuel pathways are located within a series of planar fuel platelets.

11. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein said multiple separate oxidizer pathways are located within a series of planar oxidizer platelets.

12. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein said multiple separate fuel pathways are located within a series of planar fuel platelets and wherein said multiple separate oxidizer pathways are located within a series of planar oxidizer platelets, at least two of said fuel platelets stacked with at least one oxidizer platelet there between.

13. An injection system for premixing reactants before delivery, such as into a combustion chamber, the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein said multiple separate fuel pathways are located within a series of planar fuel platelets, wherein a center of said fuel platelets is open to define part of a mixing chamber, at least a portion of said separate fuel pathways extending toward a center of said platelet until said separate fuel pathways terminate at said fuel outlets.

14. The system of claim 13 wherein said fuel pathways of at least one of said fuel platelets is oriented tangent to a line spaced from a center point of said fuel platelet at a location along said pathway where said fuel exits said fuel platelet at said fuel outlet.

15. An injection system for premixing reactants before delivery, such as into a combustion chamber the system comprising in combination:

a fuel inlet coupled to a source of fuel;

an oxidizer inlet coupled to a source of oxidizer;

a plurality of separate fuel pathways located downstream from said fuel inlet, each said fuel pathway leading to a fuel outlet;

a plurality of separate oxidizer pathways located downstream from said oxidizer inlet, each said oxidizer pathway leading to an oxidizer output;

each said fuel outlet located adjacent to one of said oxidizer outputs, said outlets and said outputs located adjacent a mixing region where mixing of the fuel and the oxidizer occurs to create a reactant mixture including the fuel and the oxidizer;

a face located downstream from said mixing region; and wherein a cross-sectional area of said oxidizer outputs is approximately twice as great as a cross-sectional size of said fuel outlets, and wherein a number of fuel outlets and a number of oxidizer outputs are substantially equal to each other.

* * * * *